(12) United States Patent
Alsheuski

(10) Patent No.: US 10,656,679 B2
(45) Date of Patent: May 19, 2020

(54) SECURELY MOUNTING ELECTRONIC DEVICE BATTERY PACK

(71) Applicant: Aliaksandr Alsheuski, Vilnius (LT)

(72) Inventor: Aliaksandr Alsheuski, Vilnius (LT)

(73) Assignee: JSC Yukon Advanced Optics Worldwide, Vilnius (LT)

( * ) Notice: Subject to any disclaimer, the term of this patent is extended or adjusted under 35 U.S.C. 154(b) by 121 days.

(21) Appl. No.: 16/070,464

(22) PCT Filed: Jan. 16, 2017

(86) PCT No.: PCT/IB2017/050216
§ 371 (c)(1),
(2) Date: Jul. 16, 2018

(87) PCT Pub. No.: WO2017/122184
PCT Pub. Date: Jul. 20, 2017

(65) Prior Publication Data
US 2019/0025883 A1    Jan. 24, 2019

Related U.S. Application Data

(60) Provisional application No. 62/279,670, filed on Jan. 16, 2016.

(51) Int. Cl.
*G06F 1/16* (2006.01)
*H01M 2/10* (2006.01)

(52) U.S. Cl.
CPC .......... *G06F 1/1635* (2013.01); *G06F 1/1658* (2013.01); *H01M 2/1022* (2013.01); *H01M 2220/30* (2013.01)

(58) Field of Classification Search
CPC combination set(s) only.
See application file for complete search history.

(56) References Cited

U.S. PATENT DOCUMENTS

| | | | |
|---|---|---|---|
| 3,500,007 A * | 3/1970 | Greenslade | H01M 2/34 200/61.45 R |
| 4,810,204 A | 3/1989 | Wilson | |
| 6,102,725 A | 8/2000 | Panagiotou | |
| 6,549,791 B1 * | 4/2003 | Jeon | H04B 1/385 379/433.08 |
| 7,334,443 B2 * | 2/2008 | Meekma | E05B 47/063 307/10.2 |

(Continued)

OTHER PUBLICATIONS

International Search Report and Written Opinion issued in PCT/IB2017/050216, dated May 24, 2017.

*Primary Examiner* — Kaity V Chandler
(74) *Attorney, Agent, or Firm* — Fish & Richardson P.C.

(57) ABSTRACT

A securely mounting electronic device battery pack (B-PACK) for electronic devices includes an outer casing (102) and one or more power cells (202) disposed within the outer casing to provide power to an electronic device. A locking pin (104) is configured to traverse through a locking pin engagement opening (306) and locking spring (304) of a locking lever (114) of the electronic device when the locking lever is in an unlocked configuration. The locking lever is rotatable around a central axis between the unlocked and a locked configuration. A power interface port (106) engages a charging interface port (302) of the electronic device.

20 Claims, 5 Drawing Sheets

(56) References Cited

U.S. PATENT DOCUMENTS

| | | | |
|---|---|---|---|
| 2004/0058231 A1* | 3/2004 | Takeshita | H01M 2/1066 429/123 |
| 2007/0051548 A1* | 3/2007 | Kosco | B62K 5/027 180/208 |
| 2009/0186264 A1 | 7/2009 | Huang | |
| 2010/0040946 A1* | 2/2010 | Tsuji | H01M 2/1022 429/175 |
| 2010/0209752 A1* | 8/2010 | Lerner | H01M 2/1055 429/97 |
| 2012/0055687 A1* | 3/2012 | Martinsson | B25F 5/02 173/20 |
| 2012/0071866 A1* | 3/2012 | Kerr | A61B 18/10 606/13 |
| 2016/0336557 A1* | 11/2016 | Miller | A01D 34/416 |

* cited by examiner

SECURELY MOUNTING ELECTRONIC DEVICE BATTERY PACK

CLAIM OF PRIORITY

This application claims priority to U.S. Provisional Patent Application No. 62/279,670 filed on Jan. 16, 2016, the entire contents of which are hereby incorporated by reference.

BACKGROUND

Electronic devices (for example, optical devices such as a firearm scope, spotting scope, binocular, telescope, etc.) with sensors and/or projected digital information (for example, reticles, windage/elevation data, temperature/humidity/atmospheric pressure data, etc.) need a constant source of power from a power system (for example, a power pack) with a sufficient life to allow meaningful use of the electronic device without the need to recharge or swap the power system frequently. Once power levels in the power system fall below a defined threshold, the electronic device should integrate with the power system to allow the device to shutdown proactively without data loss. Power packs should also be simple to recharge without special equipment and easy to replace if necessary. Convenient size, weight, and mounting methods are also important considerations in power systems for electronic devices.

SUMMARY

The present disclosure describes a securely mounting electronic device battery pack (B-PACK) for electronic devices.

In an implementation, a B-PACK for electronic devices includes an outer casing and one or more power cells disposed within the outer casing to provide power to an electronic device. A locking pin is configured to traverse through a locking pin engagement opening and locking spring of a locking lever of the electronic device when the locking lever is in an unlocked configuration. The locking lever is rotatable around a central axis between the unlocked and a locked configuration. A power interface port engages a charging interface port of the electronic device.

Other implementations of this aspect can include corresponding computer systems, apparatuses, and computer programs recorded on one or more computer-readable media/storage devices, each configured to perform actions of methods associated with a B-PACK for electronic devices. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The subject matter described in this specification can be implemented in particular implementations so as to realize one or more advantages as described below. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
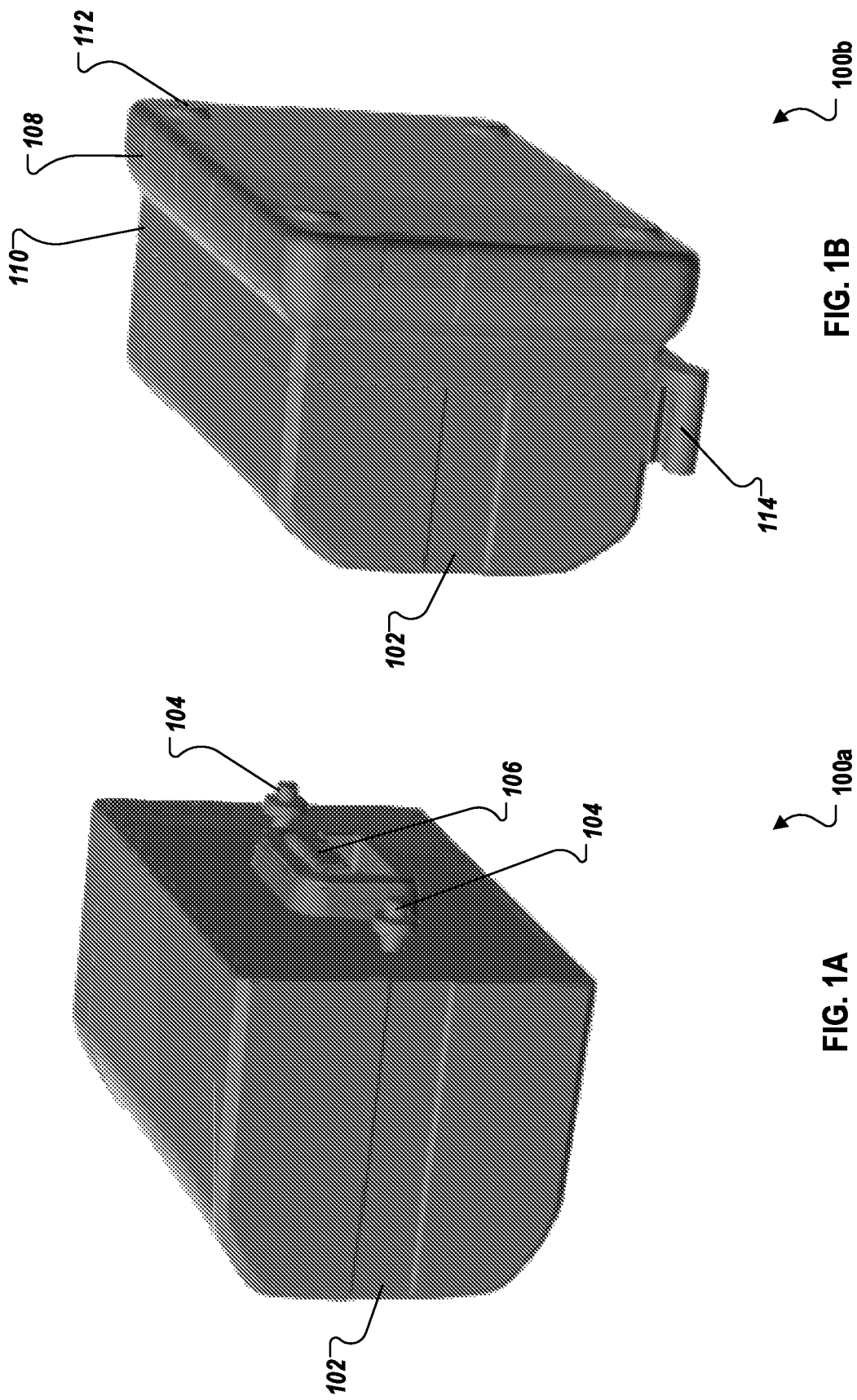
FIG. 1A is a perspective view of an example securely mounting electronic device battery pack (B-PACK) for electronic devices, according to an implementation.
FIG. 1B is a perspective view of the example B-PACK configuration of FIG. 1A attached to an example charging adaptor base, according to an implementation.

The following detailed description describes a securely mounting electronic device battery pack (B-PACK), and is presented to enable any person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications without departing from scope of the disclosure. Thus, the present disclosure is not intended to be limited to the described or illustrated implementations, but is to be accorded the widest scope consistent with the principles and features disclosed.

Current electronic devices (for example, optical devices such as a firearm scope, spotting scope, binocular, telescope, etc.) with sensors and/or projected digital information (for example, reticles, windage/elevation data, temperature/humidity/atmospheric pressure data, etc.) need a constant source of power from a power system (for example, a power pack) with a sufficient operational life to allow meaningful use of the electronic device without the need to recharge or swap the power system frequently. Once power levels in the power system fall below a defined threshold, the electronic device should integrate with the power system to allow the device to shutdown proactively without data loss. Power systems should also be simple to recharge without special equipment and easy to replace if necessary. Convenient size, weight, and mounting methods are also important considerations in power systems for electronic devices.

At a high-level, conventional batteries (or attachable power packs) of similar size and weight to the described B-PACK often have a less-than-optimal operational life and require frequent replacement/purchasing. The conventional batteries often have complicated replacement procedures or require special charging devices in order to be recharged. Electronic devices with integrated conventional batteries often shutdown in a non-graceful manner when power levels in the power system fall below a defined threshold. Also, when conventional batteries are integrated into an electronic device, the conventional batteries often cannot be charged under working conditions. Additionally, interface configurations between conventional batteries/attachable power packs vary with differing electronic devices, which can restrict/limit which conventional batteries/attachable power packs can be used with the electronic devices. With common interface configurations, entire product lines can use the same power packs for increased versatility. The power packs are also configured with the same sized interface footprint (for example, additionally added power cells can result in a deeper B-PACK housing as opposed to the interface footprint becoming larger).

What is needed is a power system (the described B-PACK) with a uniform interface configuration to allow differing configurations of the power system (for example, with higher power density, differing voltage output, etc.) to be used with electronic devices. For example, if a user would prefer for a powered electronic device carried in the course of employment to have less weight, the user could choose a lower-weight and lower-power density power system to attach to the electronic device.

The B-PACK can also provide operational time increase for electronic devices through the use of optimized power cells (that is, batteries) of varying types (for example, alkaline, Ni-Cad, lead-acid, Li-ion, etc.), more or less power cells (for example, two, four, six, or eight power cells), power use optimization/charging circuitry, and the like. If differing operational times are permitted, the configuration permits user selection of the best B-PACK configuration for a particular use.

The described B-PACK can be implemented in varying configurations. For example, some versions can include a "standard" (for example, non-replaceable rechargeable batteries), "extended" to provide use of higher capacity batteries (for example, non-replaceable rechargeable batteries), and "simple" allowing use of easily available commercial/retail non-rechargeable batteries. As will be appreciated by those of ordinary skill in the art, these described versions are for illustrative purposes only and are not meant to limit configurations (for example, battery types that can be used, etc.) or the disclosure in any way. For example, in other implementations, the "standard" or "extended" pack could use specialized non-rechargeable batteries.

The B-PACK is also configured to be easily and quickly replaceable. For example, in a particular configuration, a B-PACK mounted to an electronic device can be pushed slightly inward toward the electronic device, and slid upward to disengage one or more locking pins and power interface port from the electronic device to remove the B-PACK. One or more locking pins on a freshly charged B-PACK can then be inserted into the electronic device, the B-PACK pushed slightly inward, and slid downward to lock the B-PACK to the electronic device and to engage the B-PACK's power interface port with the electronic device.

The described B-PACK configurations can also be charged using either the electronic device (for example, by attaching the electronic device to an external power source such as a wall socket, USB port, auto power plug, AC/DC adaptor, etc.) or an external charging adaptor base (for example, plugged into a wall socket, USB port, auto power plug, AC/DC adaptor, with independent rechargeable batteries, etc.). Recharging circuitry can be configured to optimize recharging time and overall power cell life.

In typical implementations, a single B-PACK is mounted to an electronic device (for example, side, bottom, top, or other location depending on the electronic device and the most advantageous positon for the mounting of a B-PACK) to provide power to the electronic device. In other implementations, more than one B-PACK could be installable at different locations on an electronic device (for example, a primary and backup power supply so that one B-PACK could be swapped without losing power to the electronic device). In an example, in multiple B-PACK applications, internal logic circuitry of the electronic device could automatically switch to a second B-PACK and notify a user of the need to replace/recharge the primary B-PACK due to depleted power cells. In some B-Pack implementations, the electronic device could also have a built-in temporary power reserve (for example, a small capacity battery) that could keep the electronic device at a pre-determined functional level for a period of time to allow the B-PACK to be replaced/recharged, etc. and to avoid any data loss. In this way, operation of the electronic device is not interrupted.

FIG. 1A is a perspective view 100a of an example B-PACK for electronic devices, according to an implementation. The B-PACK 102 typically includes an outer casing 102, one or more locking pins 104, and a power interface port 106. As will be appreciated by those of ordinary skill in the art, the illustrated example is of only one particular implementation and is intended to assist with understanding of the described concepts. Other implementations consistent with this disclosure are considered to be within the scope of this disclosure.

Figure 3:
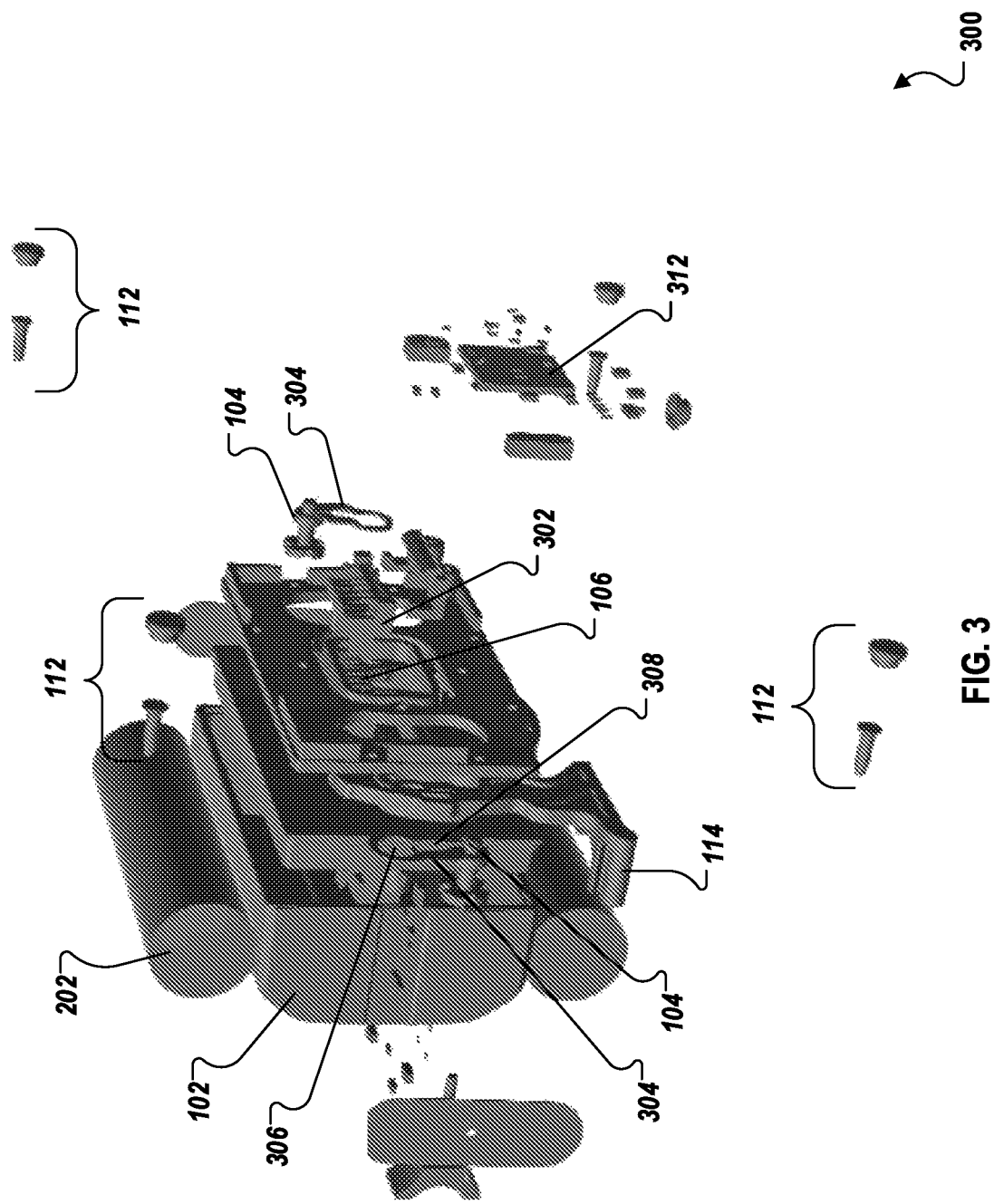
FIG. 3 is a perspective exploded view of key elements of the example charging adaptor base of FIG. 1B, according to an implementation.
Figure 4:
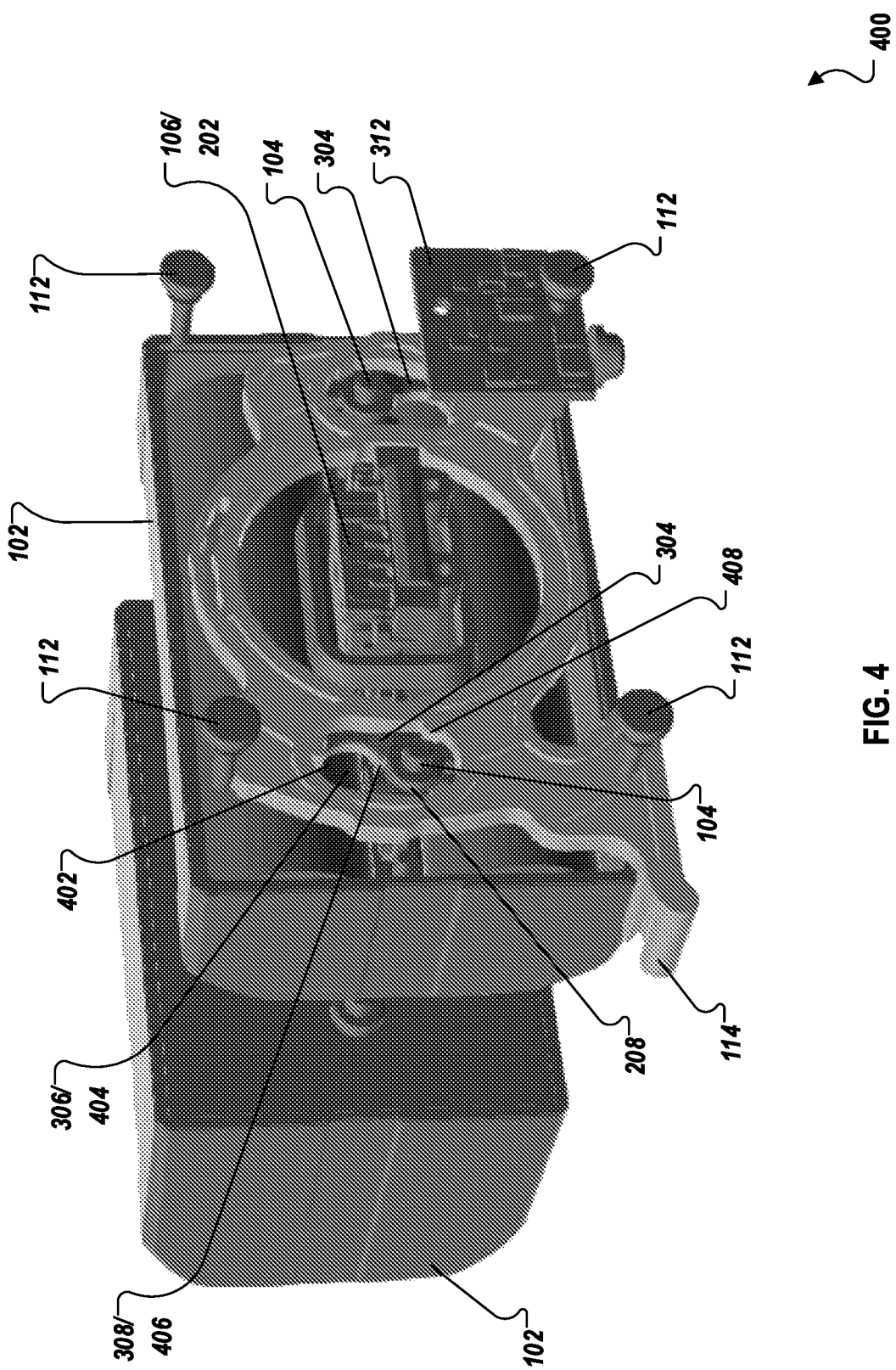
FIG. 4 is detailed perspective view of an example locking system of the example charging adaptor base of FIGS. 1B and 3, according to an implementation.

Each locking pin 104 is designed to provide a positive engagement and secure mounting to an electronic device when used with a locking mechanism (for example, refer to FIGS. 3 and 4). Although only two locking pins 104 are illustrated, alternative configurations could include one, three, or more locking pins 104.

In some implementations, the outer casing 102 of the B-PACK is sealed and not user-removable. For example, in a B-PACK configuration with a Li-ion power system, it is safer for a user to not have access to power cells (for example, refer to FIG. 2) held within the outer casing 102 or to internal charging circuitry. In other implementations, a portion of the outer casing 102 of a B-PACK (for example, a power cell compartment cover—not illustrated) can be configured to be removable to permit access to internal power cells. For example, a B-PACK can be configured to use four non-rechargeable power cells of a particular configuration (such as CR123 or "D" cells) that must be replaced once depleted. The described battery compartment cover permits a user to replace the power cells when needed.

In some implementations (not illustrated), the B-PACK can be configured with one or more external indicators (for example, LEDs, LCD displays, etc.) that indicate, for example, a current charge level of the B-PACK, charging status, projected remaining operational life, warnings, information from an interfaced electronic device, and the like. In these implementations, the B-PACK can be configured with an internal computer that provides functionality to analyze various data, functions, and operations of the B-PACK or interfaced electronic device to provide information for display on the one or more external indicators.

FIG. 1B is a perspective view 100b of the example B-PACK configuration of FIG. 1A attached to an example charging adaptor base, according to an implementation. In some implementations, the illustrated charging adaptor base 108 can be configured with an extension 110 to the outer casing of the charging adaptor base 108 to permit the outer casing 102 of the B-PACK to slip inside of the extension to help secure the B-PACK to the charging adaptor base 108. The B-PACK power interface port 106 is configured to engage with a charging interface port (not illustrated) configured as part of the charging adaptor base. The charging adaptor base 108 is also illustrated with stabilizing pads 112

(for example, rubber, silicon, etc.) used to stabilize and secure the charging adaptor base to a surface (such as a table, desk, etc.).

In typical implementations, a B-PACK can be attached (for example, set upon, latched, snapped on, etc.) on the charging adaptor base 108. In the illustration of FIG. 1B, the charging adaptor base 108 includes a locking mechanism with a locking lever 114 (refer to FIGS. 3 and 4) to permit the B-PACK to be securely locked to the charging adaptor base 108 by manipulating the locking lever 114 between two different positions (for example, locked and unlocked).

In some implementations, the charging adaptor base 108 includes a power port (not illustrated) (for example, a micro-USB or AC/DC adaptor port) to permit the charging adaptor base 108 to receive power from various power sources (for example, a wall socket, USB port, auto power plug, AC/DC adaptor, etc.). In some implementations, the charging adaptor base 108 can include (not illustrated) an internal rechargeable battery (or electrical interfaces to an external rechargeable battery) to permit charging of an attached B-PACK. Typical implementations, include a power-type button (not illustrated) to turn charging of an attached B-PACK ON/OFF.

In some implementations, the charging adaptor base 108 can include hardware/software configured to provide notification of charging status (for example, auditory, LEDs, transmission of status to a smart device application using WIFI, BLUETOOTH, etc.). Included internal charging circuitry (not illustrated) of the charging adaptor base 108 can include smart circuitry/analytics to charge an attached B-PACK in different modes (for example, fast, standard, slow, trickle, etc.) depending on needed usage as well as to analyze the B-PACK to notify a user of B-PACK problems (for example, a bad cell, incomplete charge capability, reduced charging capability, need to replace, etc.). In some implementations, hardware/software in the actual the B-PACK can perform some or all of this analysis and store data for display on an interfacing electronic device (for example, on a display, optical device field of view), on an interfaced computing device (for example, a PC, smart phone, other mobile device, etc.). As will be appreciated by those of ordinary skill in the art, the described functionality can be shared between multiple components in many different configurations. Alternative configurations of hardware/software (even when performed by other remote devices) that are consistent with this disclosure and used for for "charging," "status," "intelligence," "notification," or other functionality related to B-PACK power efficiency/operation is considered to be within the scope of this disclosure.

Figure 2:
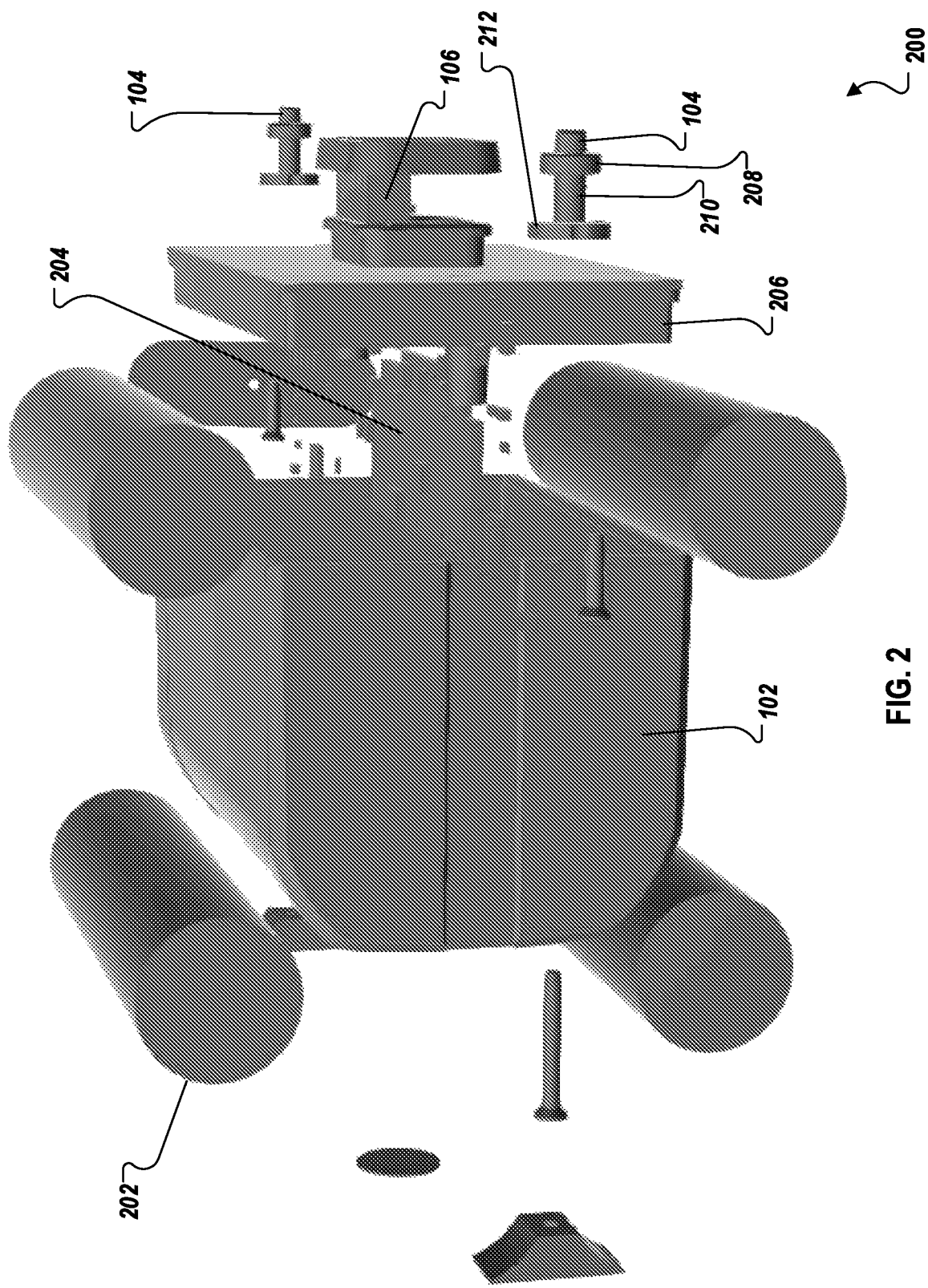
FIG. 2 is an exploded perspective view of the example B-PACK configuration of FIGS. 1A and 1B, according to an implementation.

FIG. 2 is an exploded perspective view 200 of the example B-PACK configuration of FIGS. 1A and 1B, according to an implementation. Note that not all components of FIG. 2 are specifically identified/described (for example, internal fasteners, grommets, supports, etc.). In addition to the previously-mentioned outer casing 102, locking pins 104, power interface port 106, the B-PACK includes four power cells 202, logic circuitry and software 204, and a base plate 206. Depending on configuration, the power cells 202 can be single-use or rechargeable. While they are shown in a particular configuration/orientation, power cells 202 can be installed in the outer casing 102 in any configuration.

Logic circuitry and software 204 can be used to provide power to an interfaced electronic device, receive/manage power to direct to rechargeable power cells 202, analyze charge/status of power cells 202, determine if the B-PACK is malfunctioning (for example, a malfunctioning power cell 202 or other problem), notify (for example, using a direct, wireless, etc. network connection or using the previously-described indicators) an attached electronic device, mobile device, etc. of status, errors, etc. For example, the B-PACK can be wirelessly connected to a mobile device that provides notifications through an application executing on the mobile device.

Base plate 206 attaches to outer casing 102 to contain internal components of the B-PACK. Base plate 206 also defines openings supporting the locking pins, and power interface port 106.

Locking pins 104 are designed to provide a positive engagement and secure mounting to a mounting interface configured as part of an electronic device when used with the previously-described locking mechanism (for example, see FIGS. 3 and 4). In typical implementations, the locking pins 104 are configured of metal or other strong material to provide a secure attachment to an electronic device. In some implementations, the locking pins 104 can be configured to break off under a defined amount of mechanical stress to avoid damage to the electronic device. For example, the locking pins 104 could be configured with mechanically-weak areas to separate under mechanical stress or of a plastic or other material.

Each locking pin 104 is configured with a flared head 208 and a shaft 210. The flared head 208 can be configured with front and rear flat surfaces perpendicular to the axis of shaft 210. Support base 212 is configured to secure the locking pin 104 to the base plate 206 or to other internal components of the B-PACK (not illustrated).

FIG. 3 is a perspective exploded view 300 of key elements of the example charging adaptor base of FIG. 1B, according to an implementation. Note that not all components of FIG. 3 are specifically identified/described (for example, internal fasteners, grommets, supports, etc.). FIG. 3 includes a charging interface port 302, locking springs 304, and logic circuitry and software 312.

The charging adaptor base 108 is illustrated with a locking mechanism to secure the B-PACK to the charging adaptor base 108. In some implementations, a locking mechanism can be integrated into electronic devices to accept and to secure the B-PACK when mounted to the electronic device. In some alternative implementations, the locking pins can be mounted on the electronic device and the locking mechanism (or necessary portions of the locking mechanism) can actually be part of the B-PACK assembly.

In the illustrated implementation, the charging interface port 302 is used to interface with B-PACK power interface port 106 (for example, a series of parallel electrodes can slide against each other and provide a positive electrical connection). Locking lever 114 is configured in the charging adaptor base 108 to rotate counter/clockwise between a locked and unlocked state against locking pins 104 to securely "lock" the B-PACK to the charging adaptor base 108 (or, as above, some other electronic device).

Locking spring 304 is configured as an angled flat spring and is used to assist with the locking (see FIG. 4) of the B-PACK to an electronic device. For example, the locking springs 304 can each provide an inward spring bias and a defined mechanical slot to secure the locking pins 104 into an electronic device. Locking spring 304 can define a locking pin engagement opening 306 and a locking pin engagement slot 308 to engage with the locking pin 104.

Logic circuitry and software 312 is designed to perform functionality (for example, as described above) related to providing power to an interfaced B-PACK. For example, the logic circuitry and software 312 can analyze charge/status of power cells 202, determine if the B-PACK is malfunctioning, notify (for example, direct, wireless, etc. network connection) an attached electronic device, mobile device, etc. of status, errors, etc.

FIG. 4 is detailed perspective view 400 of an example locking system of the example charging adaptor base of FIGS. 1B and 3, according to an implementation. As illustrated, the locking lever 114 and locking springs 304 are coupled together (for example, the locking springs 206 can be slipped into slots (not illustrated) machined into openings 402 defined by locking lever 114. The locking springs 304 can be held in place in the locking lever 114 by spring tension, adhesive, spot welds, or other methods known to those of ordinary skill in the art).

When in an "unlocked" state (for example, the illustrated locking lever 114 rotated counterclockwise from its illustrated position), it should be clear from view 400 that the flared head 208 of the locking pins 104 can be inserted through locking pin engagement openings 404 and through corresponding locking pin engagement openings 306 defined by locking springs 304. In some implementations, When locking lever 114 is rotated toward a "locked" state, the shafts 210 (refer to FIGS. 1A, 2, and 3) behind the flared head 208 of the locking pins 104 are guided into locking pin engagement slots 406 (and corresponding locking pin engagement slots 308 configured into the locking springs 304). Note that the locking spring 304 can rest against the areas of the openings 402 to provide support for the locking spring 304. One or more support tabs 408 can also be configured as part of openings 402 to retain the locking springs 304. Note that the openings 402 are configured to be 180 degrees in relation to each other in order to allow a rotational movement of the locking lever 114 to engage two separate locking pins on opposite sides of the rotational center axis of the locking lever 114.

The locking pin engagement slot 308 of the locking spring 304 is typically configured as part of a portion of the locking spring 206 (see FIG. 3 below the locking pin engagement openings 306) configured to angle outward to provide an inward spring bias against the rear surface of the flared head 208 of the locking pin to "push" the locking pin 104 deeper into the charging adaptor base 108 (or other electronic device) and to tightly secure the B-PACK into position to prevent rattle or other movement.

Figure 5:
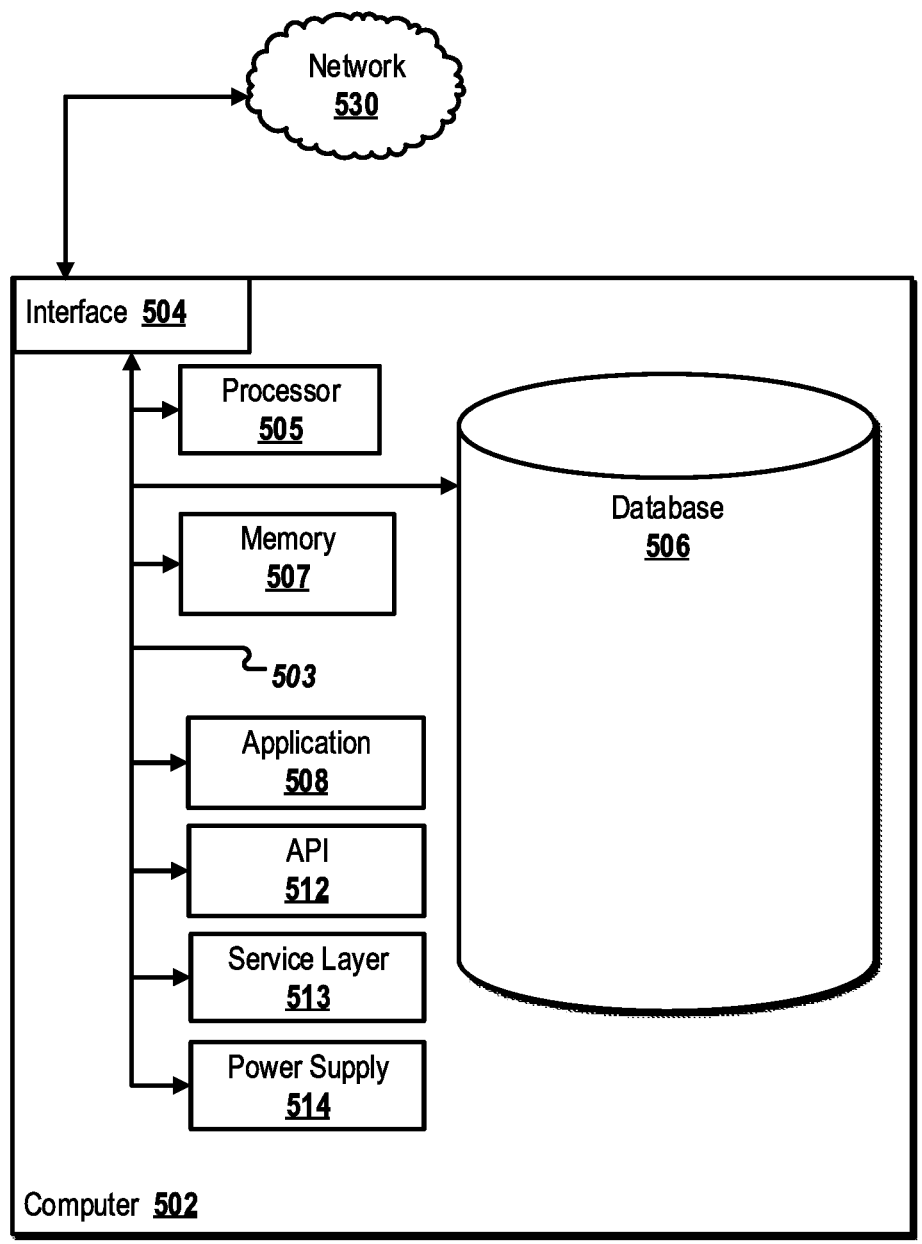
FIG. 5 is a block diagram of an exemplary computer that can be used with an electronic device or B-PACK, according to an implementation.

FIG. 5 is a block diagram of an example computer system 500 used to provide computational functionalities associated with the B-PACK as described in the instant disclosure, according to an implementation. The illustrated computer 502 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 502 may comprise a computer that includes an input device, such as a keypad, keyboard, touch screen, or other device that can accept user information, and an output device that conveys information associated with the operation of the computer 502, including digital data, visual, or audio information (or a combination of information), or a graphical user interface (GUI).

The computer 502 can serve in a role as a client, network component, a server, a database or other persistency, or any other component (or a combination of roles) of a computer system for performing the subject matter described in the instant disclosure. The illustrated computer 502 is communicably coupled with a network 530. In some implementations, one or more components of the computer 502 may be configured to operate within environments, including cloud-computing-based, local, global, or other environment (or a combination of environments).

At a high level, the computer 502 is an electronic computing device operable to receive, transmit, process, store, or manage data and information associated with the described subject matter. According to some implementations, the computer 502 may also include or be communicably coupled with an application server, e-mail server, web server, caching server, streaming data server, or other server (or a combination of servers).

The computer 502 can receive requests over network 530 from a client application (for example, executing on another computer 502) and responding to the received requests by processing the received requests using an appropriate software application(s). In addition, requests may also be sent to the computer 502 from internal users (for example, from a command console or by other appropriate access method), external or third-parties, other automated applications, as well as any other appropriate entities, individuals, systems, or computers.

Each of the components of the computer 502 can communicate using a system bus 503. In some implementations, any or all of the components of the computer 502, both hardware or software (or a combination of hardware and software), may interface with each other or the interface 504 (or a combination of both) over the system bus 503 using an application programming interface (API) 512 or a service layer 513 (or a combination of the API 512 and service layer 513). The API 512 may include specifications for routines, data structures, and object classes. The API 512 may be either computer-language independent or dependent and refer to a complete interface, a single function, or even a set of APIs. The service layer 513 provides software services to the computer 502 or other components (whether or not illustrated) that are communicably coupled to the computer 502. The functionality of the computer 502 may be accessible for all service consumers using this service layer. Software services, such as those provided by the service layer 513, provide reusable, defined functionalities through a defined interface. For example, the interface may be software written in JAVA, C++, or other suitable language providing data in extensible markup language (XML) format or other suitable format. While illustrated as an integrated component of the computer 502, alternative implementations may illustrate the API 512 or the service layer 513 as stand-alone components in relation to other components of the computer 502 or other components (whether or not illustrated) that are communicably coupled to the computer 502. Moreover, any or all parts of the API 512 or the service layer 513 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502. The interface 504 is used by the computer 502 for communicating with other systems that are connected to the network 530 (whether illustrated or not) in a distributed environment. Generally, the interface 504 comprises logic encoded in software or hardware (or a combination of software and hardware) and is operable to communicate with the network 530. More specifically, the interface 504 may comprise software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors may be used according to particular needs, desires, or particular implementations of the computer 502. Generally, the processor 505 executes instructions and manipulates data to perform the operations of the computer 502 and any algorithms, methods, functions, processes, flows, and procedures as described in the instant disclosure.

The computer 502 can also include a database 506 that can hold data for the computer 502 or other components (or a combination of both) that can be connected to the network 530 (whether illustrated or not). For example, database 506 can be an in-memory, conventional, or other type of database storing data consistent with this disclosure. In some implementations, database 506 can be a combination of two or more different database types (for example, a hybrid in-memory and conventional database) according to particular needs, desires, or particular implementations of the computer 502 and the described functionality. Although illustrated as a single database 506 in FIG. 5, two or more databases (of the same or combination of types) can be used according to particular needs, desires, or particular implementations of the computer 502 and the described functionality. While database 506 is illustrated as an integral component of the computer 502, in alternative implementations, database 506 can be external to the computer 502.

The computer 502 also includes a memory 507 that can hold data for the computer 502 or other components (or a combination of both) that can be connected to the network 530 (whether illustrated or not). For example, memory 507 can be random access memory (RAM), read-only memory (ROM), optical, magnetic, and the like storing data consistent with this disclosure. In some implementations, memory 507 can be a combination of two or more different types of memory (for example, a combination of RAM and magnetic storage) according to particular needs, desires, or particular implementations of the computer 502 and the described functionality. Although illustrated as a single memory 507 in FIG. 5, two or more memories 507 (of the same or combination of types) can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in this disclosure. For example, application 508 can serve as one or more components, modules, applications, etc. Further, although illustrated as a single application 508, the application 508 may be implemented as multiple applications 508 on the computer 502. In addition, although illustrated as integral to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 itself can include power-conversion or management circuits (including recharging, standby, or other power management functionality). In some implementations, the power-supply 514 can include a power plug to allow the computer 502 to be plugged into a wall socket or other power source to power the computer 502, recharge a rechargeable battery, etc.

There may be any number of computers 502 associated with, or external to, a computer system containing computer 502, each computer 502 communicating over network 530. Further, the term "client," "user," and other appropriate terminology may be used interchangeably as appropriate without departing from the scope of this disclosure. Moreover, this disclosure contemplates that many users may use one computer 502, or that one user may use multiple computers 502.

Described implementations of the subject matter can include one or more features, alone or in combination.

For example, in a first implementation, an apparatus comprising: an outer casing; one or more power cells disposed within the outer casing to provide power to an electronic device; a locking pin configured to traverse through a locking pin engagement opening and locking spring of a locking lever of the electronic device when the locking lever is in an unlocked configuration, the locking lever rotatable around a central axis between the unlocked and a locked configuration; and a power interface port to engage a charging interface port of the electronic device.

The foregoing and other described implementations can each optionally include one or more of the following features:

A first feature, combinable with any of the following features, wherein the locking pin comprises a shaft and a flared head configured with front and rear flat surfaces perpendicular to the axis of the shaft.

A second feature, combinable with any of the previous or following features, wherein the locking spring is configured to guide the shaft into a locking pin engagement slot configured into the locking spring.

A third feature, combinable with any of the previous or following features, wherein the locking spring provides a spring bias against the rear flat surface of the flared head when the locking lever is rotated into the locked configuration.

A fourth feature, combinable with any of the previous or following features, comprising logic circuitry and software to manage power provided to the electronic device or to recharging of the one or more power cells.

A fifth feature, combinable with any of the previous or following features, comprising a removable power cell compartment cover permitting access to the one or more power cells.

A sixth feature, combinable with any of the previous or following features, comprising a base plate attached to the outer casing and configured to define openings supporting the locking pin, and the power interface port.

A seventh feature, combinable with any of the previous or following features, comprising one or more external indicators indicating at least one of a current charge level, charging status, projected remaining operational life, warnings, or information from the electronic device.

An eighth feature, combinable with any of the previous or following features, comprising a computer configured to analyze the electronic device and to provide information for display on the one or more external indicators.

In a second implementation, an apparatus comprising: one or more power cells and logic circuitry and software to manage power provided to an electronic device through a power interface port or to recharge the one or more power cells; a locking pin configured to traverse through a locking pin engagement opening and locking spring of a locking lever of the electronic device when the locking lever is in an unlocked configuration, the locking lever rotatable around a central axis between the unlocked and a locked configuration; and an outer casing configured with a removable power cell compartment cover permitting access to the one or more power cells.

The foregoing and other described implementations can each optionally include one or more of the following features:

A first feature, combinable with any of the following features, wherein the one or more power cells are disposed within the outer casing.

A second feature, combinable with any of the previous or following features, wherein the locking pin comprises a shaft and a flared head configured with front and rear flat surfaces perpendicular to the axis of the shaft.

A third feature, combinable with any of the previous or following features, wherein the locking spring is configured to guide the shaft into a locking pin engagement slot configured into the locking spring.

A fourth feature, combinable with any of the previous or following features, wherein the locking spring provides a spring bias against the rear flat surface of the flared head when the locking lever is rotated into the locked configuration.

A fifth feature, combinable with any of the previous or following features, wherein the power interface port is configured to engage a charging interface port of the electronic device.

A sixth feature, combinable with any of the previous or following features, comprising a base plate attached to the outer casing and configured to define openings supporting the locking pin, and the power interface port.

A seventh feature, combinable with any of the previous or following features, comprising one or more external indicators indicating at least one of a current charge level, charging status, projected remaining operational life, warnings, or information from the electronic device.

An eighth feature, combinable with any of the previous or following features, comprising a computer configured to analyze the electronic device and to provide information for display on the one or more external indicators.

In a third implementation, a method comprising: inserting a locking pin into a locking pin engagement opening and locking spring of a locking lever of an electronic device when the locking lever is in an unlocked configuration; rotating the locking lever from the unlocked to a locked configuration; applying a spring bias with the locking spring against a rear flat surface of a flared head of the locking pin; and engaging a power interface port with a charging interface port of the electronic device.

The foregoing and other described implementations can each optionally include one or more of the following features:

A first feature, combinable with any of the following features, wherein rotating the locking lever from the unlocked to a locked configuration guide a shaft of the locking pin into a locking pin engagement slot configured into the locking spring.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. An apparatus comprising:
   an outer casing;
   one or more power cells disposed within the outer casing to provide power to an electronic device;
   a base plate attached to the outer casing and configured to define an opening;
   a locking pin supported by the opening and configured to extend beyond an outer surface of the base plate to permit traversal of the locking pin through a locking pin engagement opening and locking spring of a locking lever of the electronic device when the locking lever is in an unlocked configuration, the locking lever rotatable around a central axis between the unlocked and a locked configuration; and
   a power interface port to engage a charging interface port of the electronic device.

2. The apparatus of claim 1, wherein the locking pin comprises a shaft and a flared head configured with front and rear flat surfaces perpendicular to the axis of the shaft.

3. The apparatus of claim 2, wherein the locking spring is configured to guide the shaft into a locking pin engagement slot configured into the locking spring.

4. The apparatus of claim 2, wherein the locking spring provides a spring bias against the rear flat surface of the flared head when the locking lever is rotated into the locked configuration.

5. The apparatus of claim 1, comprising logic circuitry and software to manage power provided to the electronic device or to recharging of the one or more power cells through the power interface port.

6. The apparatus of claim 1, comprising a removable power cell compartment cover permitting access to the one or more power cells.

7. The apparatus of claim 1, wherein the base plate further defines another opening for the power interface port.

8. The apparatus of claim 1, comprising one or more external indicators indicating at least one of a current charge level, charging status, projected remaining operational life, warnings, or information from the electronic device.

9. The apparatus of claim 8, comprising a computer configured to analyze the electronic device and to provide information for display on the one or more external indicators.

10. An apparatus comprising:
    one or more power cells and logic circuitry and software to manage power provided to an electronic device through a power interface port or to recharge the one or more power cells;
    an outer casing configured with a removable power cell compartment cover permitting access to the one or more power cells;
    a base plate attached to the outer casing and configured to define an opening; and
    a locking pin supported by the opening and configured to extend beyond an outer surface of the base plate to permit traversal of the locking pin through a locking pin engagement opening and locking spring of a locking lever of the electronic device when the locking lever is in an unlocked configuration, the locking lever rotatable around a central axis between the unlocked and a locked configuration.

11. The apparatus of claim 10, wherein the one or more power cells are disposed within the outer casing.

12. The apparatus of claim 10, wherein the locking pin comprises a shaft and a flared head configured with front and rear flat surfaces perpendicular to the axis of the shaft.

13. The apparatus of claim 12, wherein the locking spring is configured to guide the shaft into a locking pin engagement slot configured into the locking spring.

14. The apparatus of claim 12, wherein the locking spring provides a spring bias against the rear flat surface of the flared head when the locking lever is rotated into the locked configuration.

15. The apparatus of claim 10, wherein the power interface port is configured to engage a charging interface port of the electronic device.

16. The apparatus of claim 10, wherein the base plate further defines another opening for the power interface port.

17. The apparatus of claim 10, comprising one or more external indicators indicating at least one of a current charge level, charging status, projected remaining operational life, warnings, or information from the electronic device.

18. The apparatus of claim 17, comprising a computer configured to analyze the electronic device and to provide information for display on the one or more external indicators.

19. A method comprising:
   inserting a locking pin into a locking pin engagement opening and locking spring of a locking lever of an electronic device when the locking lever is in an unlocked configuration, where the locking pin is supported by an opening defined by a base plate attached to an outer casing, where one or more power cells are disposed within the outer casing to provide power to the electronic device, and where the locking pin extends beyond an outer surface of the base plate;
   rotating the locking lever from the unlocked to a locked configuration;
   applying a spring bias with the locking spring against a rear flat surface of a flared head of the locking pin; and
   engaging a power interface port accessible through another opening defined by the base plate with a charging interface port of the electronic device.

20. The method of claim 19, wherein rotating the locking lever from the unlocked to a locked configuration guides a shaft of the locking pin into a locking pin engagement slot defined by the locking spring.

* * * * *